United States Patent [19]

Kimelman

[11] Patent Number: 5,446,900
[45] Date of Patent: Aug. 29, 1995

[54] METHOD AND APPARATUS FOR STATEMENT LEVEL DEBUGGING OF A COMPUTER PROGRAM

[75] Inventor: Paul Kimelman, Walnut Creek, Calif.

[73] Assignee: Microtec Research, Inc., Santa Clara, Calif.

[21] Appl. No.: 920,093

[22] Filed: Jul. 24, 1992

[51] Int. Cl.$^6$ ............................................. G06F 9/44
[52] U.S. Cl. ................................... 395/700; 395/180; 364/267.91; 364/280.4; 364/DIG. 1
[58] Field of Search ............... 395/500, 575, 650, 700; 364/267.91, 280.4; 371/19

[56] References Cited

U.S. PATENT DOCUMENTS

| | | | |
|---|---|---|---|
| 4,931,928 | 6/1990 | Greenfeld | 395/600 |
| 5,093,914 | 3/1992 | Coplien et al. | 395/700 |
| 5,127,103 | 6/1992 | Hill et al. | 395/575 |
| 5,142,679 | 8/1992 | Owaki et al. | 395/700 |
| 5,175,856 | 12/1992 | Van Dyke et al. | 395/700 |

OTHER PUBLICATIONS

Hennessy, "Symbolic Debugging of Optimized Code", ACM Trans. on Programming Languages and Systems, vol. 4 No. 3, Jul. 1982, pp. 323–344.
Zellweger, "An Interactive High-Level Debugger for Control-Flow Optimized Programs", ACM, 1983, pp. 159–171.
Beander, "VAX DEBUG: A Interactive, Symbolic, multiligual Debugger", ACM, 1983, pp. 173–179.
Coutant et al., "DOC: A Practical Approach to Source-Level Debugging of Globally Optimized Code", ACM Proceedings of the SIGPLAN, Jun. 1988, pp. 125–134.
IEEE Standard for Microprocessor Universal Format for Object Modules, Feb. 29, 1991 pp. 1–27.

*Primary Examiner*—Kevin A. Kriess
*Assistant Examiner*—Dennis M. Butler
*Attorney, Agent, or Firm*—Blakely, Sokoloff, Taylor & Zafman

[57] ABSTRACT

A method and apparatus for statement level debugging. Statement level debugging refers to the ability to identify a statement in a source file, i.e. a breakpoint, and have program execution suspended at that point. Further, "stepping" through the execution of the program may be performed a statement at a time. In accomplishing this a column reference is added to debugging information generated in connection with an object module. The column reference provides for distinguishing the different statements in a line of a computer program. Statement level debugging allows for more precise control of the debugging of a program. Alternative means for specifying the statement are also described.

20 Claims, 7 Drawing Sheets

Figure 4b

| Record Type | Symbol Name Index | Symbol Type Index | Attribute Definition | Line Number | Column Number |
|---|---|---|---|---|---|
| 420 | 421 | 422 | 423 | 424 | 425 |

Figure 4c

| Record Type | Symbol Name Index | Expression Defining Value for Symbol |
|---|---|---|
| 431 | 432 | 433 |

| | Line No. | Column | Address |
|---|---|---|---|
| 601 → | | 602 → | 603 → |
| 604 → | 1 | 1 | A001 |
| 605 → | 1 | 10 | A004 |
| 606 → | 1 | 22 | A003 |
| | 2 | 1 | A002 |

METHOD AND APPARATUS FOR STATEMENT LEVEL DEBUGGING OF A COMPUTER PROGRAM

BACKGROUND OF THE INVENTION

1. Field of the Invention

The present invention relates generally to the development of computer programs, and in particular to a method and apparatus for statement level debugging of a computer program.

2. Description of the Related Art

There exist in the art many known techniques for developing software, also called computer programs, for execution on computer systems. Inherent in any software development technique is the detection and correction of logic errors, commonly referred to as "bugs". A bug will typically cause unexpected results during the execution of the program. The unexpected results may cause abnormal termination of the program or erroneous data to be generated.

Most computer programs today are developed using programming languages that are compiled versus programming languages that are interpreted. In a language that is compiled, the entire program must first be converted into a format that the computer system understands. Such a converted program is often called an object module. It is the object module that is then used to execute the program. Examples of compiled languages include C, PASCAL and Fortran.

In a language that is interpreted, each statement is converted into a machine readable format as it is being executed. Such interpreted languages first require that the computer system be placed in an "environment" in which the statements of the language are interpreted. Examples of such interpretive languages are BASIC, APL and LISP. Compiled and interpreted languages, and their differences are well known to those skilled in the art.

Of primary interest are compiled languages. The development of computer programs using a compiled language involves the basic steps of writing the code, compiling (or assembling) and linking the code into a format that is understandable to the underlying computer system, and debugging errors in the program. Often, it is the debugging step that is the most difficult and time consuming process.

Prior to continuing, it may be useful to refer to Appendix A for a description of terms that are used herein and that are well understood by those skilled in the art. In any event, certain terms are described herein for the sake of convenience.

Debugging of programs may be done either manually or interactively by a debugging system mediated by a computer system. In the manual debugging of a program, the logic flow of the program and the contents of storage elements, e.g. registers and variables, is traced manually. In the interactive debugging of programs, the program is executed under the control of a monitor program, commonly located on and executed by the same computer system on which the program is executed, which provides for introducing "breakpoints" in the program. During such breakpoints, program registers and variables may be examined. In such a manner the program can be suspended at key points of the program to determine the value of the storage elements. If a storage element contains a value that is inconsistent with expected results, then the developer knows that a "bug" in the program has been introduced.

In a second debugging technique, a programmer may suspend execution at the end of each logical grouping of instructions, e.g. a line of a source file. This is known as "stepping" through the execution of the code. The operation of "stepping" is as if a breakpoint has been specified at each line of the source file.

Known interactive debugging systems allow the introduction of breakpoints or program execution "stepping" at the source file line level (i.e. line level debugging). Such known interactive debugging systems include the XRAY family of debugging systems, available from MICROTEC RESEARCH INC. of Santa Clara, Calif. However, in many instances it is desirable to be able to set breakpoints or step through program execution at more precise points than available in line level debugging. As most computer languages provide for multiple "statements" to exist on a line of the source file, it is desirable to be able to debug at the statement level. Such advantages of statement level debugging will become apparent in the description of the currently preferred embodiment.

It may seem that statement level debugging may be accomplished by separating each statement onto it's own line. However, the syntax of some programming language statements do not lend themselves to doing this. An example is a FOR loop in the C programming language. A FOR loop has three discrete statements: a loop initialization statement, an iteration statement and a test statement. All three statements may be and are commonly found on the same source line. A programmer typically places them on the same source line in order to make the FOR loop more legible. In all cases, separation of statements would require editing of the source file and the re-compilation and re-linking of the program. In many instances this is not feasible or desirable. In a very large program the compilation and linking steps could be very complex and time consuming. Generally, breakpoints are set based on results found in prior breakpoints i.e. breakpoints are set dynamically during the interactive debugging process. If the re-compilation and re-linking had to take place in order to introduce breakpoints, much time could be wasted, and more importantly, the developers mental thought process would be disrupted.

In order to suspend execution at a predetermined breakpoint, certain debugging information is needed for cross-referencing a line in the source code file with an address in the machine executable code. Debugging information is provided to the debugging system from portions of the object module. Typically, the debugging information is generated by the compiler used to generate the object module. As the generation of the debugging information causes the creation of a larger object module, as well as extending the compilation time, such debugging information is normally not generated. To cause the compiler to create such debugging information, a special compiler debugging option is specified.

Once the debugging system is provided with debugging information, it must process it so it can be used for breakpoints, program stepping or other debugging operations. Further, the debugging system must have a user interface through which a user may invoke the desired debugging operation.

There exist in the art various standards for object module formats. However, none of the standards address all of the provisions of debugging information.

One standard format for object modules is defined by the International Institute of Electrical and Electronics Engineers (IEEE) 695 standard entitled "IEEE Standard for Microprocessor Universal Format for Object Modules." A purpose of the IEEE 695 standard is to provide for portability of object modules across microprocessor based computing platforms.

Other known standardized object module formats include COFF, ELF, A.OUT and OMF86. CO FF, A.OUT and ELF are object module formats directed towards execution on UNIX ® (a registered trademark of American Telephone & Telegraph) based computer systems. The OMF86 object code format is directed towards object modules that execute on computer systems utilizing microprocessors based on the Intel family of microprocessors (e.g. the Intel 8086, 80186, 80286, 80386 and 80486 microprocessors).

Thus, it is an object of the present invention to provide the necessary debugging information in an object module for distinguishing statements in a line of a source file. It is a further object of the present invention to utilize such debugging information so as to enable statement level debugging by a debugging system. Finally, it is an object of the present invention to provide a means by which statement level breakpoints may be set.

SUMMARY

A method and apparatus for statement level program debugging, is disclosed. Statement level debugging is achieved by distinguishing statements on a line of a source file, specifying breakpoints by statement and subsequently allowing for program suspension at such breakpoints. Such statement level debugging further provides for stepping through program execution a statement at a time. The statements on a line of a source file are associated with corresponding machine code addresses. Information for making such an association is provided in an object module. Prior to interactive debugging, Line/Address Tables are constructed. The Line/Address Tables are comprised of a first table which is sorted by Line number and a second table which is sorted by machine code address. The Line/Address Tables are used to associate a line in the source code program with machine code addresses. The Line/Address Tables further contain a column reference. The column reference is used to distinguish the different statements in the source line. The column reference identifies the column number in which the first and last characters of the statement appear.

During the debugging of the program, breakpoints are set, identifying statements at which execution is to be suspended. Breakpoints are specified by referencing a line number and a statement from the source file. The statement is specified in one of two ways; by providing the order in which the statement appears in the line, or by specifying any one of the columns in which the statement appears. When the breakpoint is specified, the Line/Address Tables are searched in order to identify the appropriate machine code address at which program execution should be suspended. When the identified machine code address is encountered, program execution is suspended.

When stepping through the program, the Line/Address Tables are used to determine the range of addresses associated with the current line. When an address outside this range is about to be executed, execution is suspended.

BRIEF DESCRIPTION OF THE FIGURES

FIG. 4b illustrates the organization of an attribute record, as utilized by the currently preferred embodiment of the present invention.

FIG. 4c illustrates the organization of a value record, as utilized by the currently preferred embodiment of the present invention.

FIG. 6 illustrates a Line/Address Table as may be utilized by the currently preferred embodiment of the present invention.

DETAILED DESCRIPTION OF THE PREFERRED EMBODIMENT

Described herein is a method and apparatus for statement level debugging. In the following description, numerous specific details, e.g. the operation of certain programming language commands, are set forth in order to provide a thorough understanding of the present invention. It will be obvious, however, to one skilled in the art that the present invention may be practiced without these specific details. In other instances, certain detail has been omitted, e.g. well-known techniques for searching or sorting of data, in order not to unnecessarily obscure the description of the present invention.

As noted with reference to the prior art, Appendix A contains a description of some commonly used terms that are well understood by those skilled in the art. Such terms are used throughout the following description.

With the emergence of computing technology into daily life, the need for more and diverse application software has grown. A critical aspect in the development of application software is "debugging". Debugging refers to the activity where logic errors in the application software may be detected and corrected. A well known way for performing program debugging is termed interactive debugging. Interactive debugging involves a debugging program commonly executed by the same computer system on which the application software is being developed. In interactive debugging, the application program executes and is suspended at specified points (i.e. breakpoints). Suspension of program execution serves many useful purposes. For example the value of registers, cache variables or other data storage areas in the computer system may be viewed. Viewing such values may allow a programmer to determine whether the flow of logic is correct. Interactive debugging may also be used to determine the program logic flow itself.

Source file debugging refers to making a specification with respect to the source file as to where a breakpoint may be set. Statement level debugging allows for the specification of breakpoint at individual statements.

It should be noted that known interactive debugging systems allow specification of actual machine code addresses as breakpoints. However, developers of application software are typically unskilled in associating machine code instruction with statements in the source file. Comprehending machine code takes special skills that are not normally required by application program developers. Various optimization techniques used to exploit current processor architectures, e.g. Reduced Instruction Set Computers, further makes such machine code uncomprehendable to the typical application program developer. Thus, the present invention makes available to an application programmer functionality that is otherwise not readily available.

OVERVIEW OF A COMPUTER SYSTEM IN THE PREFERRED EMBODIMENT

Figure 1:
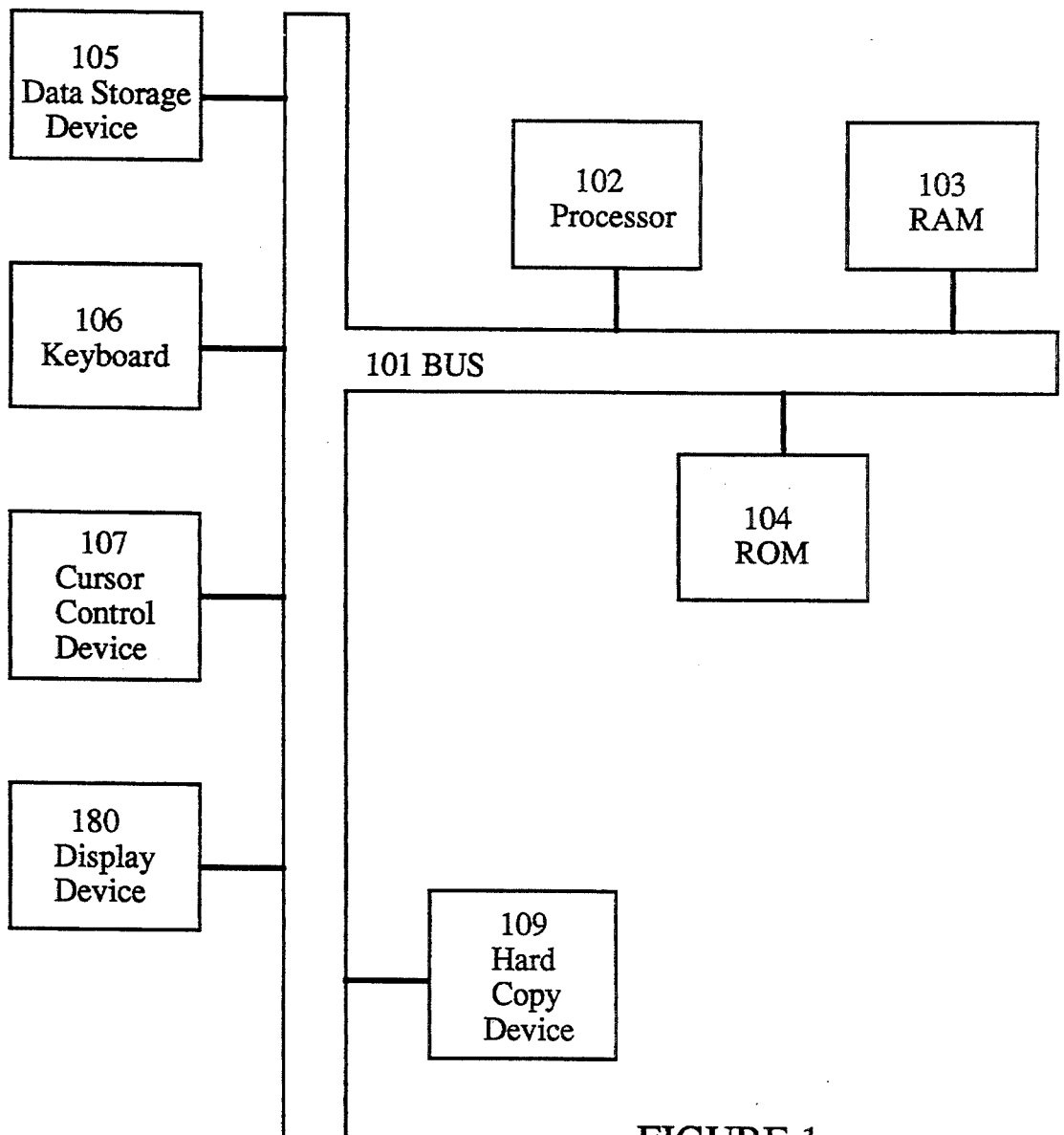
FIG. 1 illustrates a computer system upon which the preferred embodiment of the present may be implemented.

The computer system of the preferred embodiment is described with reference to FIG. 1. The present invention may be implemented on a general purpose microcomputer, such as one of the members of the SUN Microsystems family of computer systems, one of the members of the IBM Personal Computer family, or one of several work-station, multi-user, or graphics computer devices which are presently commercially available. In any event, a computer system as may be utilized by the preferred embodiment generally comprises a bus or other communication means 101 for communicating information, a processing means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement and a display device 108 coupled to said bus 101 for displaying information generated by said computer system. Additionally, it is useful if the system includes a hardcopy device 109, such as a printer, for providing permanent copies of information. The hardcopy device 109 is coupled with the processor 102 through bus 101.

It should be noted that the processor 102 performs various parts of the method of the preferred embodiment, for example, compilation, linking, constructing Line/Address Tables and processing relating to the interactive debugging process. Further, object modules may be stored in the data storage device 105.

Relationship Between Source File and Machine Code

A source file is compiled (in the case of a highlevel language) or assembled (in the case of assembler language) to create corresponding machine code. Each line in the source file will have a direct correspondence to zero or more machine code instructions. The machine code will be generated in a sequential file. The generated machine code may or may not correspond to the sequence in which the statements of the source file appear. As will be described in more detail below, the statements contained in a line of a source file, are not necessarily contiguous in the corresponding machine code. For example, optimizing compilers generate machine code for optimal performance. In order to obtain optimal performance, the sequence of execution for some statements may be rearranged or even eliminated entirely. In any event, each machine code instruction will have a corresponding machine code address. Thus, a well defined relationship exists between lines and statements of a source file and machine code instruction addresses. What is provided in the present invention is a means to identify these relationships and a means to exploit these relationships through statement level debugging using said information.

Overview of Setting-Up Interactive Debugging and Breakpoints

Figure 2:
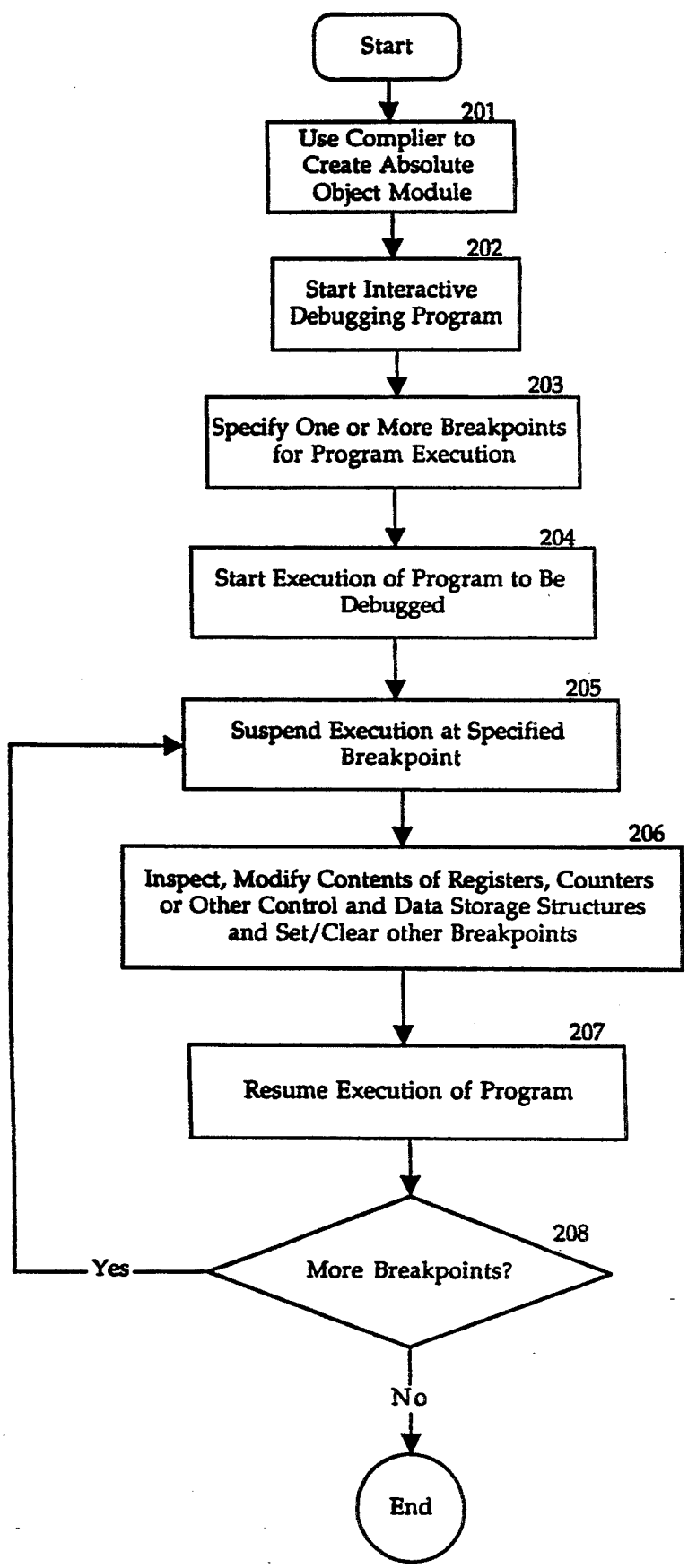
FIG. 2 is a flowchart which describes the steps required for interactive debugging.

FIG. 2 is a flowchart which describes the steps for setting-up interactive debugging and setting breakpoints. First, an object module is created, step 201. The object module is created by compiling (or assembling) and linking a source file. Typically, the compiler (or assembler) used will require an explicit direction to cause an object module to be created to contain information required for interactive debugging. The creation of an object module is described in more detail below.

Once the object module is created, an interactive debugging program is executed, step 202. An interactive debugging program is a program that monitors the execution of another program. With such a program, precise control of the execution of the program, as well as examination of program registers and variables is performed. The interactive debugging program will cause the object module to be loaded. Further, debugging information will be extracted from the object module and used to create tables containing the information which define the association between statements in the source file and machine code addresses. Once the interactive debugging program is started, one or more breakpoints in the program can be specified, step 203. The specification of the breakpoints is accomplished with respect to the source file. In prior art systems, a line in the source file is specified. As will be described in greater detail below, the present invention provides for specifying breakpoints at individual statements within a single line of the source file. When the breakpoint is set, a corresponding machine code address is identified and marked. During the execution of the program, the breakpoint occurs when the corresponding machine code address is detected in an instruction register. In any event, after specification of breakpoints, the execution of the program is then initiated, step 204.

Program execution is then suspended at an identified breakpoint, step 205. At that point, the contents of various program registers, counter or other control and data storage structures may be examined or modified as well as breakpoints being set or cleared, step 206. Once the appropriate data is noted, the execution of the program may be resumed, step 207. This is accomplished by submitting a "go" command to debug system, e.g. typing the letter "g". If the same or another breakpoint is encountered, step 208 execution is again suspended, per step 205. Otherwise, the program execution continues to completion, step 207.

As an alternative to specifying multiple breakpoints, a program may be "stepped" through, wherein program suspension occurs at each logical grouping of machine code instructions, e.g. a line of the source file. Further, any combination of stepping and breakpoints may be performed.

Overview of Statement Level Debugging

Statement level debugging refers to the ability to set debugging breakpoints at individual statements in a source file. As described with reference to the prior art, known debugging systems operate at the program source line level. However, it is typical that several statements exist on a single line. For example, the use of a statement delimiter, e.g. a semicolon, allows for the multiple statements. In other instances, an instruction or command of the programming language may be comprised of one or more statements. An example in the C programming language is the "FOR LOOP" control instruction. Generally, in a FOR LOOP, a set of instructions are executed according to "FOR LOOP Conditions" defined by the FOR LOOP. The FOR LOOP Conditions comprise multiple statements. This is illustrated with reference to the following FOR LOOP instruction:

for($i=0$; $i<MAX_{13}PRIME$; $i++$)

In the loop, there are three statements; $i=0$, $i<MAX_{13}PRIME$ and $i++$. The keyword for is used to signal how the accompanying statements are to be analyzed. As is known to those familiar with the C programming language, the three statements are an initialization statement, a condition statement and an increment statement. The statement $i=0$ initializes a loop variable i to zero. The statement $i<MAX_{13}PRIME$ define the criteria for looping along the predetermined set of instructions. Finally, the statement $i++$ causes the loop variable i to be incremented by one through each iteration of the loop.

The machine code generated that corresponds to the FOR loop does not result in contiguous statements. For example considering the sequence of statement execution for the loop:

Program Line 1: for ($i=0$; $i<MAX_{13}PRIME$; $i++$)
Program Line 2: flags[i]=1;

In this for loop, each element in an array flags is being inserted with the value 1. When compiled, a typical sequence of the execution of statements would be:

Statement 1: $i=0$
Statement 2a: jump to Statement 2b
Statement 4: flags[i]=1
Statement 3: $i++$
Statement 2b: $i<MAX_{13}PRIME$
Statement 2c: if Statement 2b TRUE, jump to Statement 4

During program execution, the statements 2b-4 would repeat so long as the condition $i<MAX_{13}PRIME$ is true. In the object code generated, the statements 1, 2a, 2b, 2c and 3 correspond to Program Line 1, while the statement 4 correspond to the Program Line 2. Also note that the statements 2a and 2c are statements generated by the compiler for loop control. As is apparent, the statements corresponding to Program Line 1 are not contiguous in the generated machine code.

In line level debugging, a breakpoint will suspend execution at either the first or last statement of a program line (the choice being dependent on the compiler that generated the object module). So in the above example, specifying a breakpoint at Program Line 1 may cause a breakpoint at either statements 1 or 3. In the statement level debugging of the currently preferred embodiment, a breakpoint may be set at any of the statements of Program Line 1 (i.e. statements 1, 3 or 2b).

It is desirable to be able to set breakpoints at the statement level in order to more accurately track program execution. For example, if a specific variable needed to be examined during an exact iteration and at an exact location of the FOR LOOP described above, statement level debugging would provide this. As a second example, if the increment statement is a function call, it would be important to be able to suspend execution prior to execution of the function call (Since there would otherwise be no way to precisely determine the state of variables and/or registers before and after the execution of the function).

In order to provide for statement level debugging, a means for associating statements in the source file with machine code instructions in the object module is needed.

Stepping

Prior to discussing how statements in a source file are associated with machine code instructions, it is useful to describe stepping through program execution. In "stepping" through a program, the program executes a line or a statement at a time. In such a manner, changes to program variables and program logic flow can be readily identified as they occur. So with reference to the foregoing example, in statement level debugging execution could be suspended upon occurrence of each of the statements 1–4.

Note that in the currently preferred embodiment, any combination of the setting of breakpoints and stepping may be performed.

Composition of an Object Module in the Currently Preferred Embodiment

Figure 3:
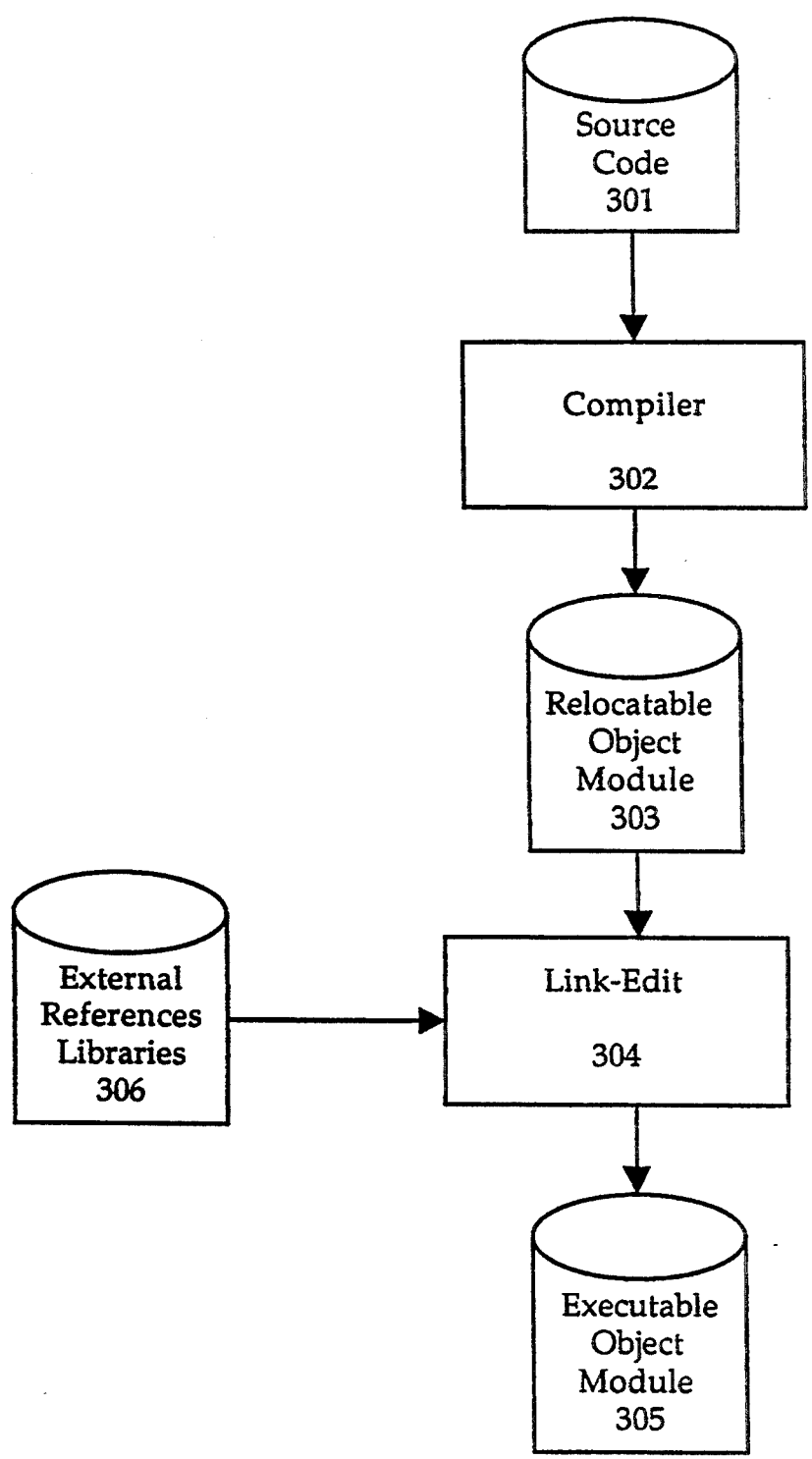
FIG. 3 illustrates the generation of an object module.

As noted with reference to the prior art, the debugging information for performing statement level debugging is extracted during compilation (or assembly) and placed in the object module for the program. The creation of an object module for a program that is compiled is described with reference to FIG. 3. A program source code file 301 is provided as an input to a compiler program 302. The compiler program 302 is a program which translates the program source code file into a relocatable object module 303. The relocatable object module 303 defines the actual machine language instructions used for execution. The relocatable object module 303 is unique to the processor on which the object code will be executing. The relocatable object module 303 may differ, depending on such facts as the compiler used and the optimization level desired. In the currently preferred embodiment, the creation of the information for statement level debugging is performed during compilation of the program source code file 301. A compilation option is provided which signals the compiler to generate such debugging information. It would have been apparent to one skilled in the art to always generate such information. However, this would have come at the expense of compilation time and space required to store the object module.

The information generated by the compilation step for statement level debugging is a column reference. The column reference is generated during the compiler operation known as parsing. In parsing, the source file is scanned and the individual statements in the source code program are extracted. The individual statements are then subject to other compiler operations such as lexical analysis or syntax checking. During parsing the column reference information for each statement is also obtained. The column reference for a statement is comprised of the first and last column in which the statement appears. For example, if a statement was in the 10th to 15th character columns of a source line, the column reference information would be 10 and 15. Parsing as a step in compilation of program code is well known in the art. Thus, no further discussion on parsing is deemed necessary. Once the column reference is generated, it is stored as part of the line information in the object module.

It should further be noted that extracting the column references to identify statements in a source line has at least one other benefit. This benefit is that if errors occur during the compilation step, very specific error messages can be generated that refer to the statement and token that caused the error.

In any event, once the compilation is completed and relocatable object module generated, a link-edit program 304 is then used to construct the executable object module 305. The link-edit program resolves external references to routine libraries 306 (e.g. to subroutine libraries).

Figure 4A:
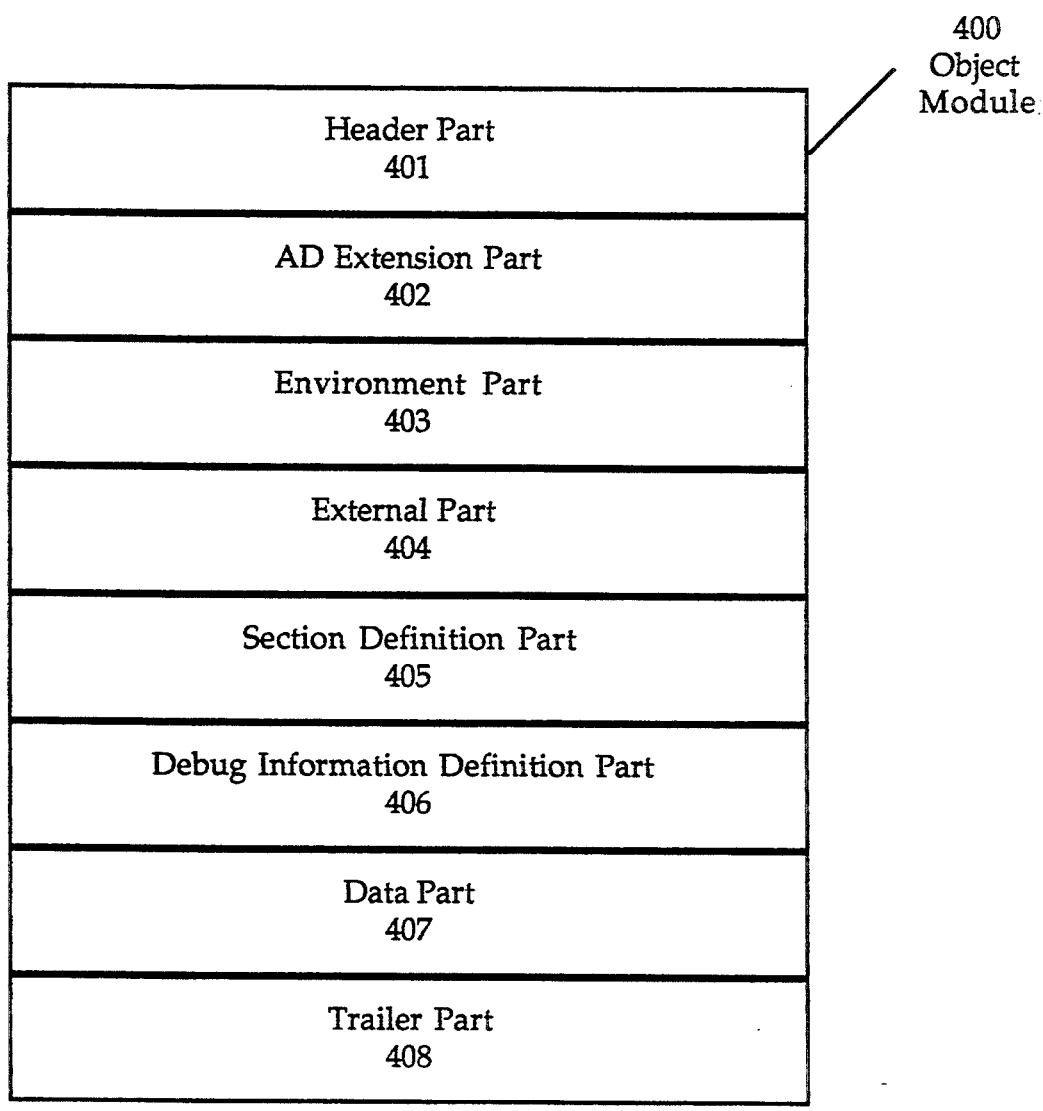
FIG. 4a illustrates the organization of an object module for interactive debugging, as utilized by currently preferred embodiment of the present invention.

As noted with reference to the prior art, standards for object modules include IEEE 695 entitled "IEEE Standard for Microprocessor Universal Format for Object Modules", COFF, A.OUT, ELF and OMF86. None of the standards specifically address the generation of extended information for program debugging. To that end, the currently preferred embodiment defines an object module format extension which provides statement level debugging information. An object module format of the currently preferred embodiment is described with reference to FIG. 4a. The object module format of FIG. 4a provides extended debugging information for the aforementioned IEEE 695 format. It should be noted however, that the module implementation of the currently preferred embodiment is not meant to limit the spirit and scope of the present invention. Any generated object module wherein an association between a statement in a source line and a corresponding machine code address is made, would not depart from the spirit and scope of the present invention.

The object module 400 is comprised of a Header Part 401, an Address Descriptor (AD) Extension Part 402, an Environment part 403, an External Part 404, a Section Definition Part 405, Debug Information Definition Part 406, Data Part 407 and Trailer Part 408.

The Header Part 401 contains a Module Begin record, and Address Descriptor Record and pointers to each of the subsequent parts, namely Address Descriptor (AD) Extension Part 402, Environment part 403, External Part 404, Section Definition Part 405, Debug Information Definition Part 406, Data Part 407 and Trailer Part 408.

The Header Part 401 contains a Module Begin Record and an Address Descriptor Record. The term record is well known to those skilled in the art, and refers generally to a predetermined organization of data (e.g. a data structure). The Module Begin Record is the first record in the module and it specifies, the processor type for the computer system on which the module is executing and the module name. The Address Descriptor Record describes the characteristics of the computer system processor.

The AD Extension Part 402 is optional and contains information relating to how the object module was created. Such information may be used for rebuilding and providing historical information.

The Environment Part 403 contains information relating to the host environment where the object module was created. Note that object modules may be relocatable. For example, in the distribution of commercial software, source code is generally not distributed. Only the object module is distributed. Thus, the Environment Part 403 would contain certain information that may be needed for execution on a computer system on which the object module was not created. Such environment information would include creation date and time, identification of the host environment and information concerning the linker being used.

The External Part 404 contains information used to define and to resolve references for symbols in different modules when they are combined by linking. It further contains all public symbols resolved by linking (a public symbol is available to all modules).

The Section Definition Part 405 contains information defining the different sections of the module. As used in this description, a section refers to a contiguous area of memory which contains a part of the object code program.

The Data Part 407 contains the actual memory contents of each section, including the machine code and initial data valves.

The Trailer Part 408 contains an execution starting address and a Module End Record. The Module End Record must be the last record in the module.

Finally, the debugging information is found in the Debug Information Definition Part 406. The Debug Information Definition Part 406 is comprised of records that define how to determine the symbol related information for a module at execution time. The symbol related information is required for debuggers that provide high-level debugging capabilities including but not limited to statement level debugging. The records in the Debug Information Definition Part 406 are organized into blocks. Blocks are defined for type definitions, variables and functions. Blocks are also defined for source file debugging information and assembler debugging information. Of particular interest is the block for source file debugging information.

The block for source file debugging contains three record types. The first record type, called Variable Name Records, are for declaring variable names, type names and line numbers, i.e. symbols. Note that in the case of source level in:formation, the Variable Name Records are empty. The second record type, called Attribute Records, are for defining attributes of a corresponding symbol or line. The third record type, called Value Records, are for defining addresses of variables.

The information used to associate a line of program source code with a machine code address is termed a "line number". Typically, a program will have many lines, thus requiring large amounts of "line number" information. In order to minimize the impact upon the size of the object module, only one Variable Name Record is defined for a program source code block. The "line number" information is contained in corresponding pairs of Attribute and Variable Records.

The Attribute record of the currently preferred embodiment has a data structure that is dependent on the data it represents. Thus, the attribute record may have a different structure if it represents a variable, than it does when it represents a line number. FIG. 4b illustrates the format of an Attribute Record when it represents a "line number". A record type field 420, identifies the record type. In the currently preferred embodiment, the record type field 420 will identify the type of record. This information is used in the interpretation of the data records. A symbol name index field 421 refers to the single Variable Name Record. The symbol type index field 422 is used to identify the data type used for symbols but is unused in the instance of "line numbers".

Attribute definition field 423 is used to specify the type of information the record contains. Here, the record would specify that the record contains "line number" information. Line number field 424 contains the line number of the program source code. Column field 425 contains the column reference information for a statement. A column reference of zero indicates no column reference information is provided.

FIG. 4c illustrates the format for a Value record. The first two fields of value record 430 are identical in use to the first two fields of the attribute record described above, namely a record type field 431 and a symbol name index field 432. The remaining field in the value record is an expression field 433. The expression field 433 is used to define an expression representing the desired value. In this instance, the desired value is the machine code address.

Prior to starting the debugging process, the information found in the Debug Information Definition Part 406 of the object module is used to create the Address/Line Table and the Line/Address Table. The information for creating the tables is found in the "line numbers" information, e.g. the attribute and value records. The Address/Line Table is sorted by the Address Field. Generally, a single line of source code will result in the generation of multiple machine instructions. Additionally, some lines may result in more than one group of machine instructions, separated by the instructions of a different line. Similarly, the Line/Address Table is sorted by the Line Field. Here, since one line may refer to multiple object code addresses, there may be multiple entries with the same line number. Additionally, different statements from the same line may be in the line table. Based on the information in the two sorted tables, it is possible to perform statement level debugging. The next section describes how breakpoints are specified and how the debugging information is used to prevent incorrect machine addresses from being used.

Specification of a Statement Level Breakpoint

In order to specify breakpoints at the statement level, means are provided to identify specific statements. In the currently preferred embodiment of the present invention, this is done by associating a character column range with specific statements in a line.

In order to make such an association, an initial column reference point is established. Generally, the beginning column for a line of code is the left most character column. By convention, the first and last character columns in which a statement appears comprise the statement column reference.

In the currently preferred embodiment, the column reference number is added to the Address/Line and Line/Address Tables of the preferred embodiment. The column reference will specify the first and last columns in which a character in a corresponding statement in a line appear.

In order to specify a breakpoint at a particular statement on a line, the currently preferred embodiment provides a number of means. In a first technique, the line number is specified along with the statement number. Such a syntax is
Line number. Statement number The statement number is the sequential order in which the statement appears on the program line. The statement number is identified by comparing the character column range associated with the different statements on the program line as ordering.

In a second technique, the line number and a column in which the statement appears are specified. Such a syntax is
Line number:Column number An association between the column and the statement can be made by inspecting the column ranges of table entries associated with the program line. More commonly this type of specification may be done by using a pointing device such as a mouse to point to the specific statement upon which a breakpoint may be set. Well known techniques for identifying the line and column numbers from the location pointed to by the pointer device may then be invoked.

In determining which of the specification techniques is to be used, it would simply be a matter of determining the character following the Line number. If it is a period, the next value is a statement number. If it is a colon, the next value is a column number.

As user interfaces and means for interacting with computer systems change, other means of specifying statement level breakpoints, may be employed. Utilization of such other techniques for specifying a breakpoint would not depart from the spirit and scope of the present invention.

Figure 5:
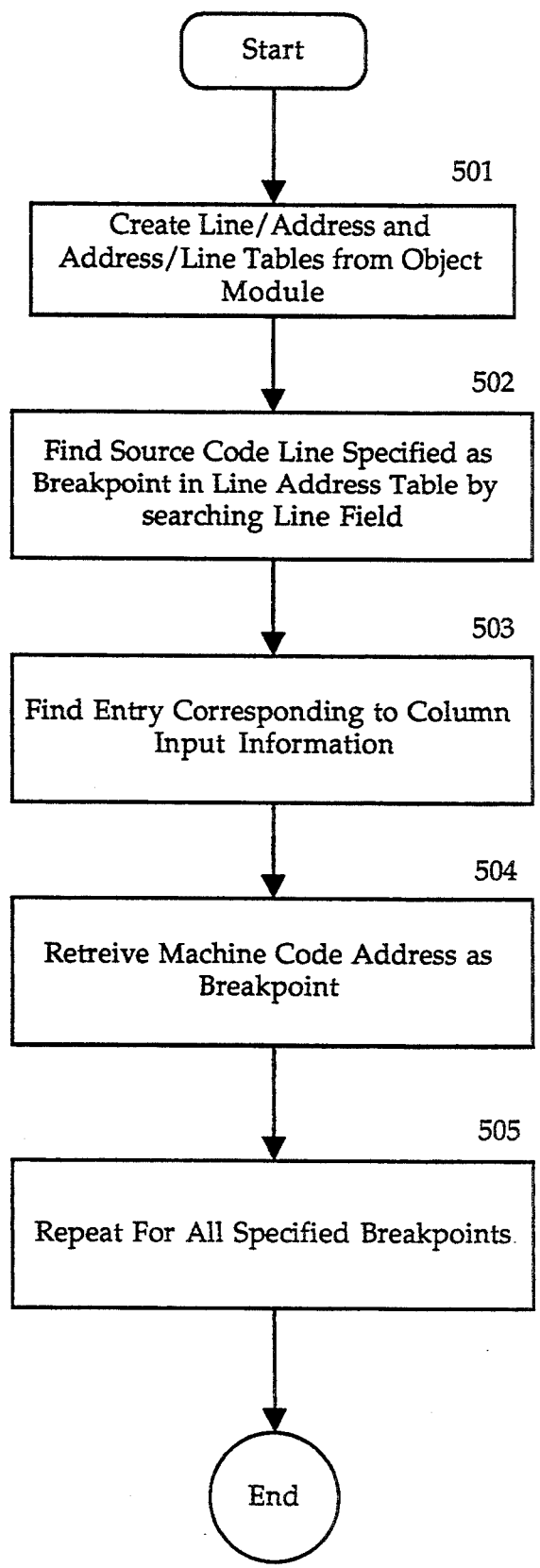
FIG. 5 is a flowchart which describes the steps for identifying a machine code address from a statement level breakpoint specification, as may be performed by the currently preferred embodiment of the present invention.

Identification of the Machine Address Corresponding To a Statement Level Breakpoint The identification of breakpoints is described with reference to FIG. 5. First, the debugging tables are created from information provided in the object module, step 501. As noted above, two of the tables created are a Line/Address Table and an Address/Line Table. Each of the tables includes column reference information which has been derived from the debugging information. Assuming that a statement level breakpoint has been specified, the specified line number is used as an index into the Line/Address Table to find the entries with the corresponding line number, step 502. These entries are then examined to determine which entry satisfies the specified breakpoint, step 503. This is done by examining the column reference. By examining the values in the column reference, the sequence of statements is determined. The lower number column references correspond to the lower sequence statement number. In any event, once the proper entry is identified according to the above criteria, the machine code address is retrieved as the breakpoint, step 504. The steps 502–504 are then repeated for all specified breakpoints, 505.

Identification of the breakpoint is specified with reference to FIG. 6 and the following lines of program source code:
Program Line 1: for (i=0; i<MAX$_{13}$PRIME; i++)
Program Line 2: flags[i]=1; Recall that the statements in these lines will be executed in the sequence (and with the following assumed addresses):
A0001: i=0
A0004: i<MAX$_{13}$PRIME
A0002: flags[i]=1
A0003: i++
AO004: i<MAX$_{13}$PRIME In this example, the statement i<MAX$_{13}$PRIME is the one selected. As described above, this may be done by specifying (program line, statement) or (program line, column number). For example, the statement may be specified as (1.2) or (1:15).

FIG. 6 illustrates a Line/Address table for the foregoing code section. Note that an Address/Line Table may be constructed simply by providing the Machine Code Addresses and a pointer to the corresponding entry in the Line/Address Table. This has certain advantages including minimizing the memory required to store the debugging tables. In any event, the Line/Address Table contains a Line Number Column 601, a Column Reference Column 602 and an Address Column 603. As described above, the Line/Address Table is sorted by program source code line number.

In order to find the corresponding machine code address for (1.2), the Line Number Column 601 is searched for entries having the desired line number. Here, the entries 604-606, i.e. the entries of program source line 1, will be identified. Next, the values in column reference column 602 are compared to identify the one with the second lowest value (corresponding to it being the second statement in the line). Here, the entry 605 has the second lowest value in the column reference column 602 (i.e. a value of 10.) Thus, the machine code breakpoint address is identified from the Address Column 603 as A004.

In the alternative method for specifying a statement level breakpoint, i.e. (1:15), the entries in the Line/Address Table will be identified in the manner as described above. The difference is in how the column reference column is utilized. Here the criteria is to find the entries in which the specified column reference value bounds. Here, the column reference values of the entries 605 and 606 bound the value 15. As it is known that the value in the column reference column identifies the first column which the statement is found, the entry 605 represents the statement associated with column 15. Thus, as before the machine code breakpoint address is identified from the Address Column 603 as A004.

Identification of the Machine Address While Program Execution Stepping

It should first be understood that each statement will have associated with it a range of machine code addresses. Such a range of machine code addresses for a statement is determined by examining the Address/Line Table entries for each statement. Since the Address/Line Table is sorted by Machine Code Address, it is simply a matter of identifying the entries for a particular statement. These entries will inherently define the range of machine code addresses for a statement.

Whenever a machine code address is encountered that is outside this range, program execution may be suspended. Upon invocation of a command to resume execution, e.g. the aforementioned "go" command, the program execution will continue. Again, a range of addresses would be determined and execution would continue until a machine code address is encountered that is outside this subsequent range of addresses.

Thus, a computer mediated method and apparatus for statement level debugging is disclosed.

| APPENDIX A | |
|---|---|
| BREAKPOINT | A location or point during execution of a program, where execution may be suspended. During such a period of suspension, the values of program registers and variables may be examined or modified. Additionally, other breakpoints can be set/cleared. |
| COLUMN | An addressable unit for each character in a program line. |
| MACHINE CODE | The resulting machine code instructions after compilation of a source file, also known as object code or target code. The machine code is comprised of the processor instructions for execution on the processor of the target computer system. |
| OBJECT MODULE | A file containing the machine executable code, processor information and debugging information for a corresponding source file. The contents of the object module are described in greater detail below. |
| STATEMENT | A discrete or primitive operation of a programming language. |
| STEPPING | A debugging technique where program execution is suspended at each occurrence of a logical grouping of machine code addresses. In the preferred embodiment, said logical grouping is a line of program code. |
| SOURCE FILE | A file containing source programming language statements. |
| SOURCE LINE | A syntactically correct sequence of statements that exist on a single text line. |

What is claimed is:

1. In an interactive debugging system monitoring a first computer program executing on a computer system, a computer mediated method for suspending said first computer program executing on said computer system at a statement in said first computer program comprising the steps of:
   a) executing a compiler on said computer system, said compiler controlling said computer system to perform the steps of:
      1) loading a source file comprising said first computer program from a data storage device coupled to said computer system to a main memory of said computer system;
      2) compiling said source file on said computer system;
      3) generating in said main memory an object module from said source file, said object module having machine code instructions corresponding to said first computer program, each of said machine code instructions having:
         i) a machine code address,
         ii) a line number of a line in said source file, and
         iii) a column reference of a statement on said line in said source file, said column reference comprising one or more column numbers of said statement; and
      4) storing said object module on said data storage device;
   b) executing said interactive debugging system comprising a second computer program on said computer system, said interactive debugging system controlling said computer system to perform the steps of:
      1) loading said object module from said data storage device to said main memory;
      2) extracting from said object module said machine code address, said line number and said column reference of a statement for each of said machine code instructions;
      3) constructing therefrom a line table in main memory associating said line number, said column reference and said machine code address for each of said machine code instructions;

4) displaying said source file on a display device coupled to said computer system;

5) selecting a first statement in said source file at which execution of said machine code instructions is to be suspended;

6) obtaining from said line table a first machine code address corresponding to said first statement;

7) executing said machine code instructions corresponding to said first computer program; and, 8) suspending execution of said machine code instructions at said first machine code address.

2. The method recited in claim 1 wherein step b) further comprises the steps of:
   a) selecting a second statement in said source file at which execution of said machine code instructions is to be suspended;
   b) obtaining from said line table a second machine code address corresponding to said second statement;
   c) resuming execution of said machine code instructions corresponding to said first computer program; and,
   d) suspending execution of said machine code instructions at said second machine code address.

3. The method recited in claim 1 wherein step b) further comprises the steps of:
   a) selecting a second statement in said source file at which execution of said machine code instructions is to be suspended;
   b) obtaining from said line table a second machine code address corresponding to said second statement;
   c) deselecting said first statement in said source file at which execution of said machine code instructions was suspended;
   d) resuming execution of said machine code instructions corresponding to said first computer program; and,
   e) suspending execution of said machine code instructions at said second machine code address.

4. The method recited in claim 1 wherein step b) further comprises the steps of:
   a) selecting an additional statement in said source file at which execution of said machine code instructions is to be suspended;
   b) obtaining from said line table an additional machine code address corresponding to said additional statement;
   c) resuming execution of said machine code instructions corresponding to said first computer program;
   d) suspending execution of said machine code instructions at said additional machine code address; and,
   e) repeating steps a) through d).

5. The method recited in claim 4 further comprising the step of:
   a) prior to step a), deselecting said first statement in said source file at which execution of said machine code instructions was suspended.

6. The method recited in claim 4 further comprising the step of:
   a) prior to step e), deselecting said additional statement at which execution of said machine code instructions was suspended.

7. The method recited in claim 1 wherein step b) further comprises the steps of:
   a) deselecting said first statement in said source file at which execution of said machine code instructions was suspended;
   b) resuming execution of said machine code instructions corresponding to said first computer program;
   c) suspending execution of said machine code instructions at a next machine code address corresponding to a next statement in said source file; and,
   d) repeating steps b) and c).

8. The method recited in claim 1 wherein the step of selecting a first statement in said source file at which execution of said machine code instructions is to be suspended is further comprised of the steps of providing said line number and a statement number of said first statement in said source file.

9. The method recited in claim 8 wherein the step of obtaining from said line table a first machine code address corresponding to said first statement is comprised of the steps of:
   a) identifying a set of entries in said line table having said line number of said first statement in said source file;
   b) identifying an entry in said set of entries with said column reference corresponding to said statement number;
   c) extracting said machine code address from said entry; and,
   d) providing said machine code address as said first machine code address.

10. The method recited in claim 8 wherein said statement number is a number indicating a sequential order in which said first statement appears on said line in said source file.

11. The method recited in claim 1 wherein the step of selecting a first statement in said source file at which execution of said machine code instructions is to be suspended is further comprised of the steps of providing said line number and a column number of any column associated with said column reference of said first statement in said source file.

12. In an interactive debugging system monitoring a first computer program executing on a computer system, a computer mediated method for suspending said first computer program executing on said computer system at a statement in said first computer program comprising the steps of;
   a) executing a compiler on said computer system, said compiler controlling said computer system to perform the steps of:
      1) loading a source file comprising said first computer program from a data storage device coupled to said computer system to a main memory of said computer system;
      2) compiling said source file on said computer system;
      3) generating in said main memory an object module from said source file, said object module having machine code instructions corresponding to said first computer program, each of said machine code instructions having:
         i) a machine code address,
            a line number of a line in said source file, and
            a column reference of a statement on said line in said source file, said column reference comprising one or more column numbers of said statement; and, 4) storing said object module on said data storage device;

b) executing said interactive debugging system comprising a second computer program on said computer system, said interactive debugging system controlling said computer system to perform the steps of:

1) loading said object module from said data storage device to said main memory;

2) extracting from said object module said machine code address, said line number and said column reference of a statement for each of said machine code instructions;

3) constructing therefrom a line table in main memory associating said line number, said column reference and said machine code address for each of said machine code instructions;

4) displaying said source file on a display device coupled to said computer system;

5) selecting a first statement in said source file at which execution of said machine code instructions is to be suspended;

6) obtaining from said line table a first machine code address corresponding to said first statement:

7) executing said machine code instructions corresponding to said first computer program; and, 8) suspending execution of said machine code instructions at said first machine code address.

13. The method recited in claim 12 wherein step b) further comprises the steps of:

a) resuming execution of said machine code instructions corresponding to said first computer program;

b) suspending execution of said machine code instructions at a next machine code address corresponding to a next statement in said source file; and, c) repeating steps a) and b).

14. The method recited in claim 13 wherein step b) further comprises the steps of:

a) determining that said next machine code address corresponds to said next statement in said source file by obtaining from said line table said next machine code address corresponding to said next statement; and, b) suspending execution of said machine code instructions at said next machine code address.

15. A first computer program executing on a computer system for monitoring a second computer program executing on said computer system, comprising:

a) object module generation means of loading a source file comprising said second computer program from a data storage device coupled to said computer system to a main memory of said computer system, generating in said main memory an object module from said source file, said object module having machine code instructions corresponding to said second computer program, each of said machine code instructions having 1) a machine code address, 2) a line number of a line in said source file, and, 3) a column reference of a Statement on said line in said source file, said column reference comprising a first column number and a last column number of said statement, and storing said object module on said data storage device;

b) line table construction means loading said object module from said data storage device to said main memory, and constructing therefrom a line table in said main memory, said line table associating with each of said machine code instructions a corresponding said machine code address, said line number, and said column reference;

c) breakpoint specification means setting a breakpoint in said main memory at a machine code address corresponding to a column reference of a statement in said line table at which execution of said machine code instructions is to be suspended; and, d) program execution suspension means executing said machine code instructions on said computer system and suspending execution of said machine code instructions at said breakpoint.

16. The computer system for monitoring the computer program executing on said computer system recited in claim 15 wherein said program execution suspension means is further comprised of stepping means executing said machine code instructions on said computer system and suspending execution of said machine code instructions at each said column reference of a statement.

17. The computer system for monitoring the computer program executing on said computer system recited in claim 16 wherein said stepping means is further comprised of means controlling said computer system to perform the identifying a range of said machine code addresses for said each said column reference of a statement and means determining when said execution of said machine code instructions on said computer system is outside said range of machine code addresses.

18. A method of constructing a line table from an object module, comprising the computer implemented steps of:

a) compiling a source file of a computer program into said object module having machine code instructions, including the steps of 1) linking each of said machine code instructions with a line number of a line from said source file, 2) linking each of said machine code instructions with a column reference of a statement from said source file, and 3) linking each of said machine code instructions with a machine code address; and, b) constructing from said object module said line table in a main memory of said computer system, said line table having said line number of said line from said source file, said column reference of a statement from said source file, and said machine code address for each of said machine code instructions.

19. The method recited in claim 18 further comprising the steps of:

a) displaying said source file of said second computer program and accepting user input specifying a column reference of a first statement in said source file of said second computer program;

b) obtaining from said line table said machine code address corresponding to said column reference of said first statement;

c) executing said machine code instructions; and, d) suspending step c) at said machine code address obtained in step b), 20. The method recited in claim 19 further comprising the steps of:

a) accepting user input specifying a column reference of a second statement in said source file of said second computer program;

b) obtaining from said line table said machine code address corresponding to said column reference of said second statement;

c) resuming execution of said machine code instructions; and, d) suspending step c) at said machine code address obtained in step b).

* * * * *